(12) United States Patent
Polan

(10) Patent No.: US 10,420,968 B2
(45) Date of Patent: Sep. 24, 2019

(54) FIRE PROTECTION SPRINKLER WITH A WRENCH BOSS DETENT AND A CLIP, AND METHOD OF ASSEMBLING THE FIRE PROTECTION SPRINKLER

(71) Applicant: The Reliable Automatic Sprinkler Co., Inc., Liberty, SC (US)

(72) Inventor: George S. Polan, Liberty, SC (US)

(73) Assignee: The Reliable Automatic Sprinkler Co., Inc., Liberty, SC (US)

( * ) Notice: Subject to any disclaimer, the term of this patent is extended or adjusted under 35 U.S.C. 154(b) by 190 days.

(21) Appl. No.: 15/513,431

(22) PCT Filed: Sep. 23, 2015

(86) PCT No.: PCT/US2015/051769
§ 371 (c)(1),
(2) Date: Mar. 22, 2017

(87) PCT Pub. No.: WO2016/049218
PCT Pub. Date: Mar. 31, 2016

(65) Prior Publication Data
US 2017/0312561 A1 Nov. 2, 2017

Related U.S. Application Data

(60) Provisional application No. 62/054,190, filed on Sep. 23, 2014.

(51) Int. Cl.
*A62C 31/28* (2006.01)
*A62C 31/02* (2006.01)
(Continued)

(52) U.S. Cl.
CPC .............. *A62C 31/28* (2013.01); *A62C 31/02* (2013.01); *A62C 37/11* (2013.01); *F16K 17/383* (2013.01)

(58) Field of Classification Search
CPC ......... A62C 31/28; A62C 31/02; A62C 37/11; A62C 37/12; F16K 17/383
(Continued)

(56) References Cited

U.S. PATENT DOCUMENTS

| 467,970 | A | | 2/1892 | Hall |
| 777,783 | A | * | 12/1904 | Garrett .................. A62C 37/12 169/39 |

(Continued)

FOREIGN PATENT DOCUMENTS

EP 0 948 973 A1 10/1999

OTHER PUBLICATIONS

Notification of and International Search Report and Written Opinion dated Dec. 22, 2015, in corresponding International Patent Application No. PCT/US2015/51769.
(Continued)

*Primary Examiner* — Chee-Chong Lee
*Assistant Examiner* — Joseph A Greenlund
(74) *Attorney, Agent, or Firm* — Venable LLP

(57) ABSTRACT

A fire protection sprinkler includes a sprinkler body having a boss including a circumferential portion having flat edges, and including a cavity on one of the flat edges, a closure element configured to be held in an output orifice to seal a flow of fluid from the output orifice, and a clip. The clip has a first portion that is engaged with the closure element, and a second portion configured to be inserted into the cavity on the one of the flat edges of the circumferential portion of the boss of the sprinkler body, and configured to contact the cavity such that, upon actuation of the fire protection sprinkler, the clip rotates about an axis passing through two points of contact between the cavity and the second portion, and moves the closure element moves away from the sprinkler body to permit the flow of fluid from the output orifice.

36 Claims, 6 Drawing Sheets

(51) Int. Cl.
*A62C 37/11* (2006.01)
*F16K 17/38* (2006.01)

(58) Field of Classification Search
USPC .................................................. 169/37, 38
See application file for complete search history.

(56) References Cited

U.S. PATENT DOCUMENTS

| | | | | |
|---|---|---|---|---|
| 793,821 A * | 7/1905 | Cass, Jr. | ................ | A62C 37/09 |
| | | | | 169/40 |
| 4,108,247 A * | 8/1978 | Mohler | .................. | A62C 37/14 |
| | | | | 169/38 |
| 4,611,665 A * | 9/1986 | Byrne | .................... | A62C 37/10 |
| | | | | 137/855 |
| 5,653,004 A | 8/1997 | Russo | | |
| 5,775,431 A * | 7/1998 | Ondracek | .............. | A62C 37/14 |
| | | | | 169/37 |
| 5,927,890 A * | 7/1999 | Job | ........................ | A62C 37/14 |
| | | | | 403/2 |
| 6,024,177 A * | 2/2000 | Winebrenner | ......... | A62C 31/28 |
| | | | | 169/37 |
| 6,112,820 A * | 9/2000 | Job | ........................ | A62C 37/14 |
| | | | | 169/37 |
| 6,369,368 B2 * | 4/2002 | Graf | ...................... | F24H 9/1863 |
| | | | | 219/526 |
| 7,218,258 B2 * | 5/2007 | Delanghe | ............... | H03M 1/183 |
| | | | | 341/118 |
| 7,766,092 B2 * | 8/2010 | Perkovich | .............. | A62C 35/68 |
| | | | | 138/103 |
| 8,528,653 B1 * | 9/2013 | Silva, Jr. | ................ | A62C 37/14 |
| | | | | 169/17 |
| 8,844,554 B2 | 9/2014 | Kikuchi et al. | | |
| 9,604,084 B2 * | 3/2017 | Kadoche | ................ | A62C 35/68 |
| 9,682,263 B2 * | 6/2017 | Kadoche | ................ | A62C 35/62 |
| 2011/0155265 A1 | 6/2011 | Kikuchi et al. | | |
| 2011/0214886 A1 * | 9/2011 | Orr | ........................ | A62C 35/68 |
| | | | | 169/37 |
| 2017/0312561 A1 * | 11/2017 | Polan | .................... | A62C 37/11 |

OTHER PUBLICATIONS

International Preliminary Report on Patentability dated Mar. 28, 2017, in corresponding International Patent Application No. PCT/US2015/51769.

Search Report dated Apr. 20, 2018, issued in corresponding European Patent Application No. 15845412.4.

* cited by examiner

FIRE PROTECTION SPRINKLER WITH A WRENCH BOSS DETENT AND A CLIP, AND METHOD OF ASSEMBLING THE FIRE PROTECTION SPRINKLER

RELATED APPLICATION

This application claims the benefit of U.S. Provisional Patent Application No. 62/054,190, filed Sep. 23, 2014, the contents of which is hereby incorporated by reference as if fully stated herein, as are the contents of all other documents referred to in this specification (in the versions of those documents current as of Sep. 23, 2015).

BACKGROUND

This disclosure relates generally to a fire protection sprinkler and to a method of assembling such a fire protection sprinkler. More specifically, this disclosure relates to a fire protection sprinkler comprising a wrench boss detent and a cooperating clip that provide reliable action and may facilitate assembly of the fire protection sprinkler.

Conventionally, fire protection sprinklers are connected to a conduit that supplies a pressurized fire-extinguishing fluid, such as water. A typical fire protection sprinkler has a base with a threaded portion for connection to the conduit to receive the fluid, and an output orifice to output the fluid to provide fire control and/or fire suppression. The output orifice is sealed by a seal cap, which is held in place by a release mechanism. The release mechanism is designed to release the cap under predetermined conditions, thereby initiating the flow of the fluid. A typical release mechanism includes a latching mechanism and a thermally-responsive element, e.g., a frangible bulb or a fusible link.

Certain conventional fire protection sprinklers have a pair of arms that extend from the base portion and meet at a hub portion to form a frame that supports a deflector plate provided to direct the fluid in the desired directions. Other fire protection sprinklers have the arms supporting a deflector plate directly, without meeting in a hub. A set screw or similar arrangement is provided to apply a pre-tension force to the latching mechanism.

A sprinkler may be listed to comply with the Standard for Safety for Automatic Sprinklers for Fire-Protection Service (UL 199), the Standard for Safety for Residential Sprinkler for Fire-Protection Service (UL 1626), or the Standard for Safety for Early-Suppression Fast-Response Sprinklers (UL 1767), each of which is published by Underwriter's Laboratories, of Northbrook, Ill., United States. UL 199, UL 1626, and UL 1767 include operation lodgment tests to verify that parts released from a fire protection sprinkler upon operation, such as the cap, " . . . clear the sprinkler frame and [the] deflector to not impair the water distribution pattern . . . ." (UL 199, p. 40F). Certain conventional fire protection sprinklers have arms, a hub, or a deflector that are designed to allow the cap to release from the fire protection sprinkler upon operation without impairing distribution of the fluid. Certain other conventional fire protection sprinklers use an ejection spring to urge the cap away from the fire protection sprinkler upon operation, such as the fire protection sprinkler described in U.S. Reissued Pat. No. 45,377.

In addition, a conventional fire protection sprinkler may be provided with a kick spring to assist in clearing portions of the release mechanism from the path of the fluid upon activation of the fire protection sprinkler. Ensuring that operating elements of the fire protection sprinkler clear the frame and the deflector without getting caught is a major source of frustration for fire protection sprinkler manufacturers.

A fire protection sprinkler may be mounted on a fluid conduit running along a ceiling, and may either extend upward from the conduit, which is referred to as an "upright" configuration, or depend downward from the conduit, which is referred to as a "pendent" configuration. Alternatively, the fire protection sprinkler may be mounted on a wall, at a certain distance below the ceiling, which is referred to as a "horizontal sidewall" configuration. Other configurations exist in which the fire protection sprinkler is oriented horizontally.

SUMMARY

In one aspect, the present invention provides a fire protection sprinkler including a sprinkler body having an output orifice, a closure element to seal a flow of fluid from the output orifice, a thermally-responsive element positioned to releasably retain the closure element, a clip, having a first portion that is engaged with the closure element, and a second portion being in contact with the sprinkler body such that, upon actuation of the fire protection sprinkler, the closure element rotates about a pre-determined axis and moves away from the sprinkler body to permit flow of the fluid from the output orifice. In particular, the portion of the sprinkler body that the clip contacts is a detent provided on a wrench boss of the sprinkler body.

In other aspects of the invention, the first portion of the clip may engage the closure element resiliently, and may comprise first and second arms extending around and engaging at least a portion of the closure element. The arms may each extend around at least ninety degrees, and up to one hundred eighty degrees, of the closure element. In addition, the second portion of the clip may extend in a first direction from the first portion, and then in a second direction that is generally oblique to the first direction, and may, for example, be shaped to wrap around the portion of the sprinkler body that it contacts. In particular, points of contact between the second portion of the clip and the sprinkler body may define the predetermined axis A-A (shown in FIG. 2) around which the closure element rotates upon actuation of the fire protection sprinkler, and, more particularly, may lay on the axis.

In still other aspects of the invention, the first portion of the clip may lie generally in a first plane, with the second portion of the clip extending away from the first plane. The first portion of the clip may form a ring, or a portion of a ring, and, in particular, may be shaped to define a fork that fits around a portion of the closure element. If the ring configuration is used, a portion of the circumference of the ring may have a portion shaped as a straight line along a chord of the ring. The second portion may be located diametrically opposite to such chord, and the first portion may, in addition to the ring (or fork), have a third portion in which the arms forming the ring or the fork extend parallel to each other, the space between them providing resilience to the clip. The clip may be made of an inherently resilient material as well.

In yet other aspects, the present invention provides the closure element having a closure element body to seal a flow of a fluid from an output orifice of the fire protection sprinkler, and a clip, having a first portion that is engaged with the closure element body, and a second portion that is configured to contact a portion of the fire protection sprinkler such that, upon actuation of the fire protection sprinkler, the closure element rotates about a pre-determined axis and moves away from the output orifice to permit flow of the fluid from the output orifice. In other aspects of the invention, including at least some of those described above, the clip is structured and is engaged with the sprinkler body in such a manner that the clip, in moving out of the way of the extinguishing fluid, moves in the same manner as a clapper and hinge pin arrangement. In various embodiments, including at least some of those described above, the structure of the clip and the manner of its engagement with the sprinkler body are such that the same clip structure, and the same manner of engagement with the sprinkler body, can be used with fire protection sprinklers of varying sizes, such as fire protection sprinklers with (for example) K-factors of as little as 2.0 gpm/(psi)$^{1/2}$ and as great as 50.0 gpm/(psi)$^{1/2}$ or more.

In yet another aspect, the present invention provides a method of assembling a fire protection sprinkler, the method comprising providing a sprinkler body having an output orifice, a closure element to seal a flow of fluid from the output orifice, and a clip, having a first portion that is resilient and shaped to engage with the closure element, and a second portion that is configured to contact the sprinkler body such that, upon actuation of the fire protection sprinkler, the closure element rotates about a pre-determined axis and moves away from the sprinkler body to permit flow of the fluid therefrom, and attaching the clip to the closure element by resiliently fitting the clip to the closure element, and placing the closure element to seal the output orifice.

Further features and advantages, as well as the structure and operation of various embodiments herein, are described in detail below with reference to the accompanying drawings.

DETAILED DESCRIPTION

Figure 1:
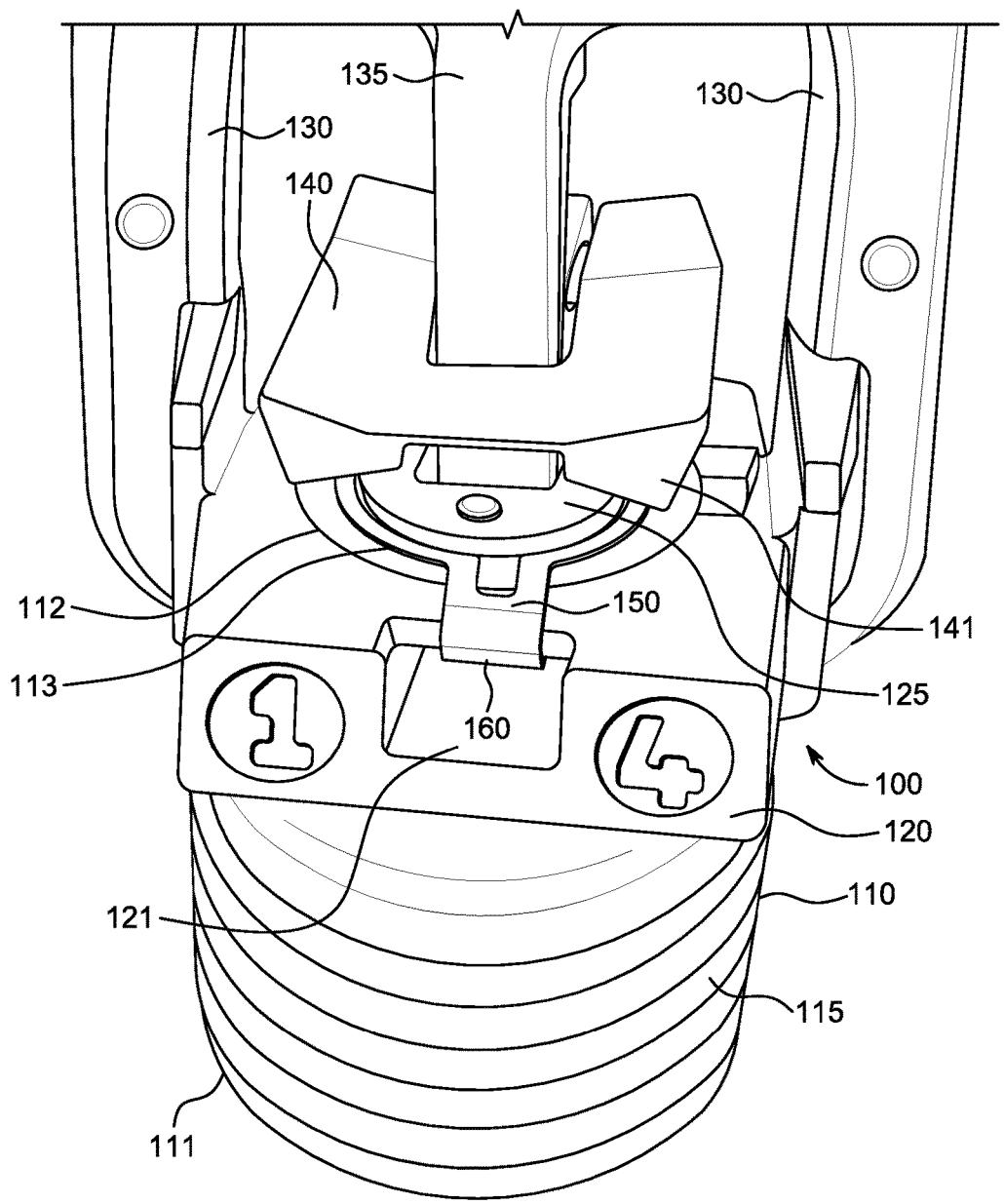
FIG. 1 is a view of an upright fire protection sprinkler according to one embodiment.

The embodiments of the invention described herein are described in detail with reference to the drawings. These embodiments are non-limiting embodiments, in which like reference numerals represent similar structures throughout the several views of the drawings, even if the structure is not described separately with respect to each figure.

Figure 2:
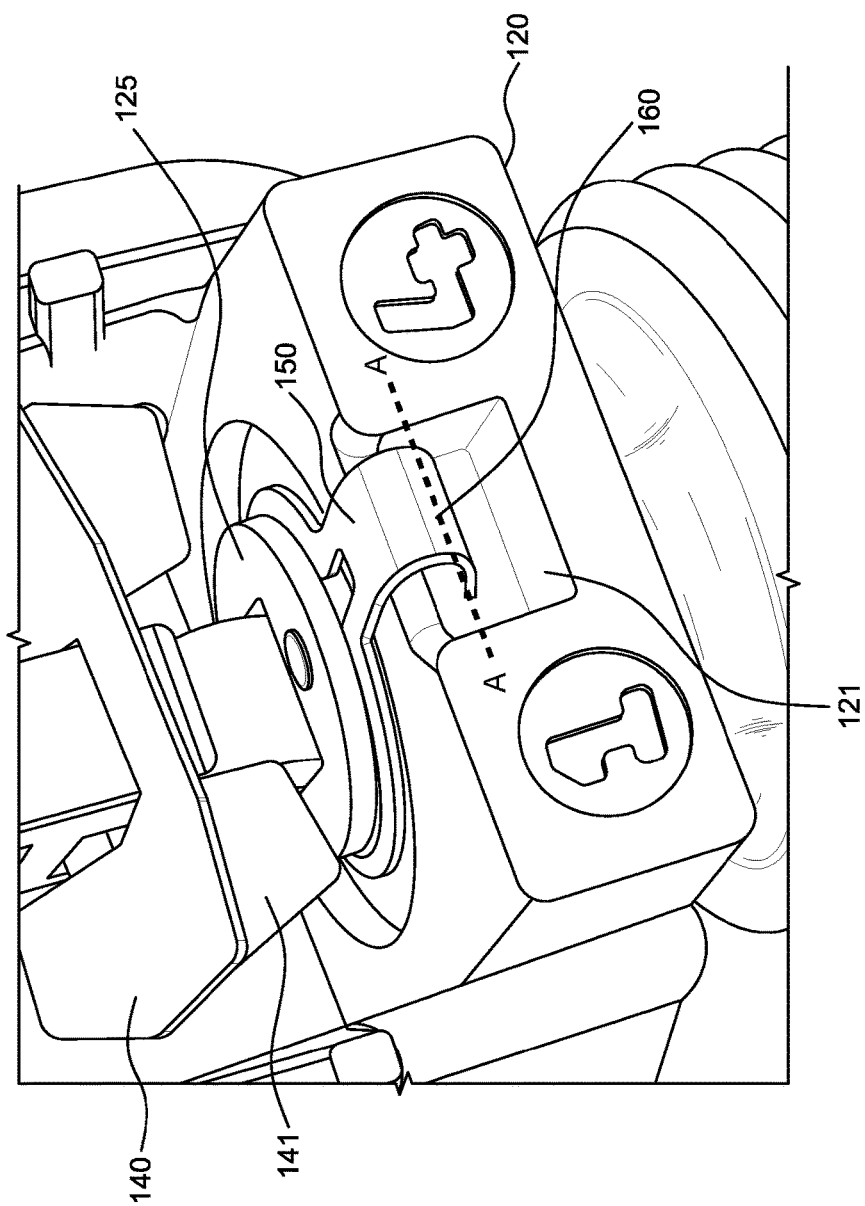
FIG. 2 is a view of a detail of the embodiment shown in FIG. 1.
Figure 3:
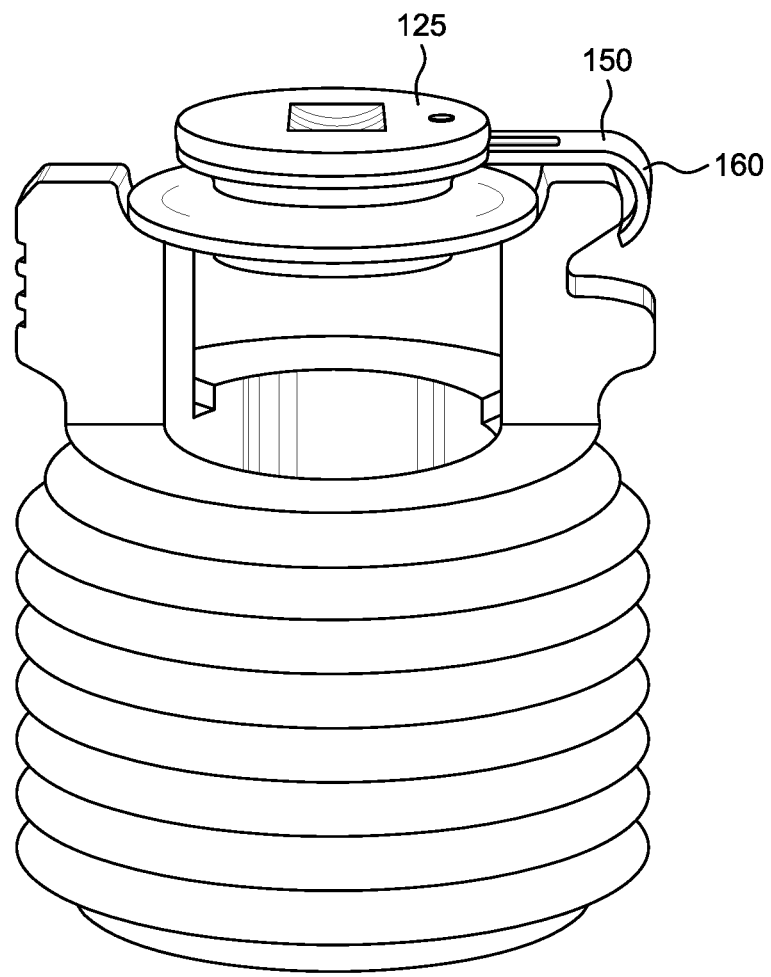
FIG. 3 is a view, partially in section, of the embodiment shown in FIGS. 1 and 2, showing certain details of that embodiment.

FIGS. 1 to 3 show an upright fire protection sprinkler 100, in accordance with an embodiment, having a cylindrical body 110 defining an axial fluid passage. The body 110 has an input orifice 111 at an input end to receive a pressurized fire-extinguishing fluid, such as water, from a conduit (not shown). The body 110 also has an output orifice 112 at an output end. The fire protection sprinkler 100 shown in FIGS. 1 to 3 is an upright fire protection sprinkler, designed to extend upward from a conduit running along a ceiling, but a closure element 113, described below, also may be used in other configurations, such as pendent and sidewall fire protection sprinklers, and the invention is not limited to upright fire protection sprinklers.

A threaded connection portion 115 is provided at the input end of the fire protection sprinkler 100 to allow the fire protection sprinkler 100 to be connected to the conduit for providing the fluid to the fluid passage. A wrench boss 120, which is a circumferential portion with flat edges to be gripped by a wrench, e.g., a square or hexagonally-shaped protrusion, facilitates the connection of the fire protection sprinkler 100 to the conduit using a wrench or a similar tool. The wrench boss 120 preferably is positioned just above the threaded connection portion 115.

The output orifice 112 is sealed by the closure element, or a seal cap, 113. The seal cap 113 may be surrounded by a ring-shaped spring washer 125. Two frame arms 130 extend from the output end and meet at a hub 135 positioned in axial alignment with the output orifice 112. A release mechanism 140, such as a fusible link assembly, is positioned between the hub 135 and the seal cap 113 to hold the seal cap 113 in place over the output orifice 112.

A deflector (unshown) is positioned on the hub 135, so as to be impinged by the output fluid upon activation of the fire protection sprinkler 100 and to direct the fluid in the downward direction, toward the area being protected below the fire protection sprinkler 100. The deflector in this particular embodiment is a conical disk that is centered on and orthogonal to the axis of the fluid passage, with the concave side facing the output orifice 112. The disk has a number of teeth (unshown) of varying length and shape arrayed around its periphery.

As previously noted, a conventional fire protection sprinkler may be provided with a kick spring to assist in clearing portions of the release mechanism from the path of the water fluid once the release mechanism has released, the illustrated embodiments utilize a clip 150 that has been found to perform such functions particularly well.

In preferred embodiments, as shown, for example, in FIGS. 1 to 3, the closure element 113 is provided with clip 150 that provides a temporary attachment to the sprinkler body 110, but when the fire protection sprinkler 100 is actuated, the clip 150 permits the closure element 113 and the clip 150 to rotate speedily out of the way of the fluid that flows from the fire protection sprinkler 100. The clip 150, in some embodiments, is formed with a first portion 151 shaped in a ring that lies in a first plane (see FIGS. 5 and 6). A second portion 152, which resembles a bent tab, extends away from the ring and is bent out of the first plane, and serves to engage the sprinkler body 110, as described below. A third portion 153 of the clip joins the first portion 151 and the second portion.

Figure 5:
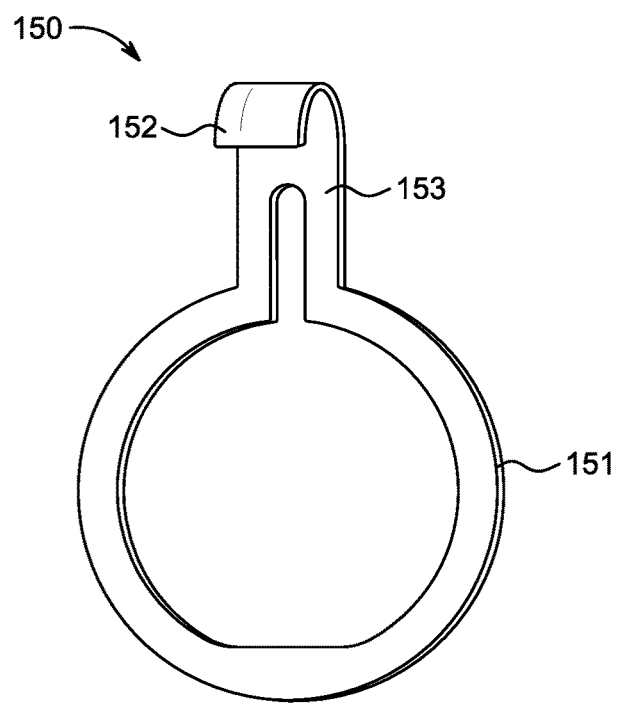
FIGS. 5 and 6 show views of a ring clip according to another embodiment.
Figure 6:
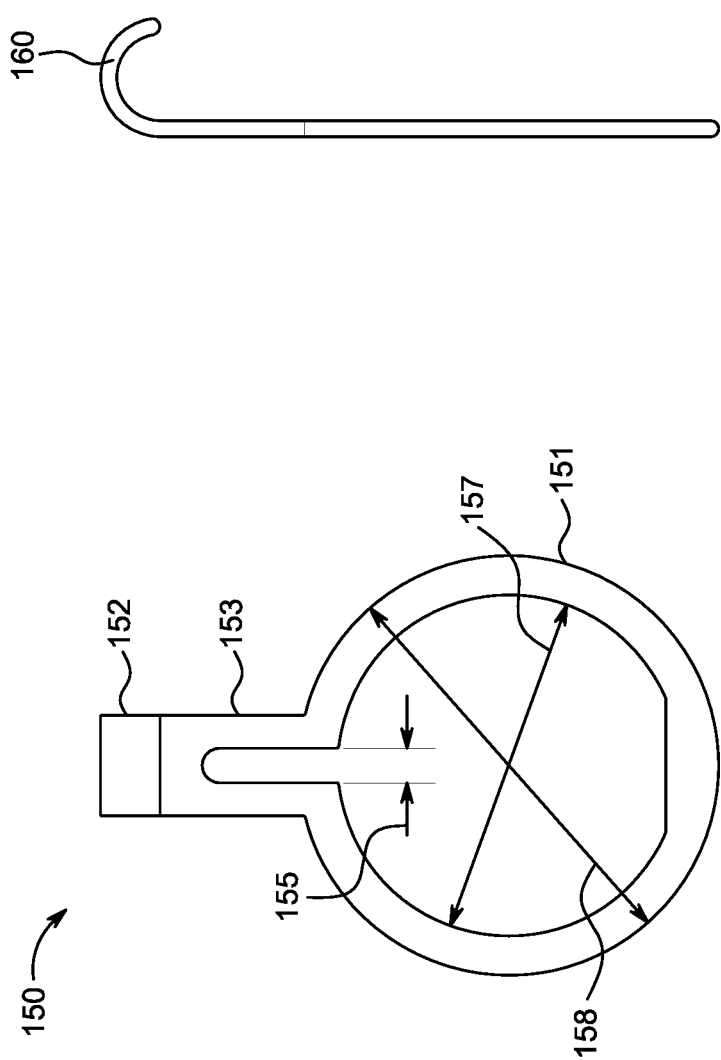

As can be seen in FIGS. 5 and 6, the ring, as the first portion 151, is largely of uniform width (the width representing the distance from an outer 158 periphery to an inner 157 periphery of the ring), with the exception of the presence of radiused shoulders at which the ring joins the third portion 153 of the clip 150, and the section of the ring opposite the third portion 153, which is formed with a non-uniform width, and in which the inner periphery of the ring is formed along a chord of the circle formed by the ring.

The third portion 153 of the clip 150 may itself be formed as extensions of the arms of the ring itself that extend parallel to each other away from the ring. A space 155 left between these two extensions increases the resilience of the clip 150.

The second portion 152 may, as shown, for example, in FIGS. 5 and 6, have the form of a tab 160 extending from the third portion 153 of the clip 150, and may be bent out of the plane of the ring, to form a handle or a hook-shaped portion. The bending is done to give the handle or hook-shaped portion 160 a circular cross section, with a uniform radius. As seen in the cross-sectional views of the clip 150, for example, in FIG. 6, the curved handle or hook-shaped portion 160 subtends in cross section an arc of generally over 90 degrees and less than 180 degrees, and, preferably, about 120 to 160 degrees, and most preferably about 145 degrees. The handle or hook-shaped portion 160 of the clip 150 is preferably uniformly radiused, but this is not strictly necessary, and a varying radius may be used, as may a configuration with a bend in the hook-shaped portion 160.

As shown in the partial cross-sectional view of the sprinkler body 110 in FIG. 3, with the closure element 113 in the output orifice 112, the closure element 113 has a body portion that is located in the outlet orifice 112 of the fire protection sprinkler 100. The body portion of the closure element 113 has upper and lower ends that are relatively large in diameter (the relative terms "upper" and "lower" are used for convenience, and refer to the orientation of the closure element 113 when positioned in the output orifice 112 of an upright fire protection sprinkler). A narrower middle section is between the ends, and a resilient disk, such as a Belleville washer, as the spring washer 125, is secured to the body portion of the closure element 113 in that narrow middle portion. The Belleville washer 125 has a greater diameter than the output orifice 112, and is seated on a shoulder or a seat formed in the sprinkler body 110 at the output orifice 112 for that purpose.

Also secured to the narrow middle part of the closure element 113 is the clip 150. The ring (i.e., the first portion 151) of the clip 150 is fitted over the end of the closure element 113 that is farther from the output orifice 112, and the handle or hook-shaped portion 160 (i.e., the second portion 152) extends radially outward over the edge of the wrench boss 120 and into a cavity 121 formed in the wrench boss 120. In the embodiment shown, the handle or hook-shaped portion 160 of the clip 150 actually contacts the wrench boss 120 along a line that is approximately at the upper edge of the cavity 121.

When the fire protection sprinkler 100 is in place (i.e., installed) in an occupancy to be protected against fire, the closure element 113 is pressed into the output orifice 112 with a sufficient force by a set screw, to keep the output orifice 112 closed, and to prevent water flow from the fire protection sprinkler 100. Upon actuation, the thermally-responsive element 140 fuses or breaks, for example, in response to the heat condition causing actuation, and removes a compressive load that has held the closure element 113 firmly against the output orifice 112. The closure element 113 is then urged away from the output orifice 112, by the spring force of the Belleville washer 125, and, of course, by the force of the fluid itself. In the illustrated embodiments, the closure element 113, due to the presence of the clip 150, rotates about an axis determined by the line along which the handle portion 160 of the clip 150 contacts the cavity (or the wrench boss detent) 121, thus moving quickly and cleanly out of the path of the fluid, and then simply falls away from the fire protection sprinkler 100, since the clip 150 is not permanently attached to the fire protection sprinkler 150.

Figure 4:
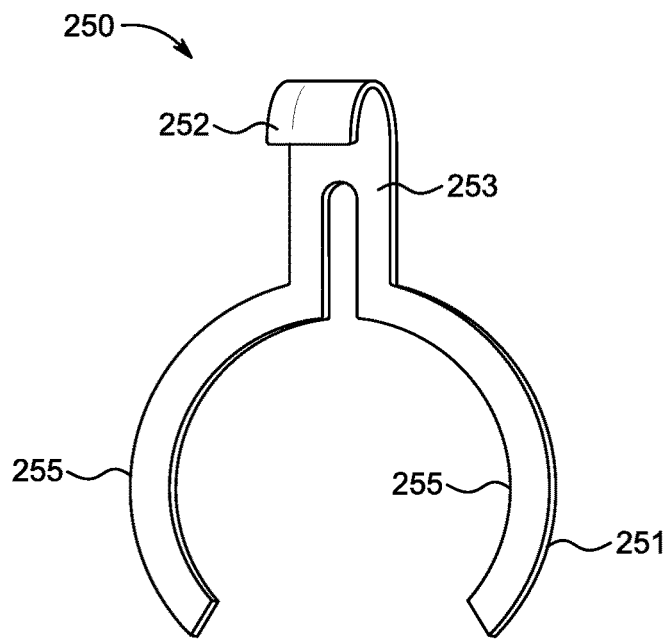
FIG. 4 shows a view of a fork clip according to an embodiment.
Figure 7:
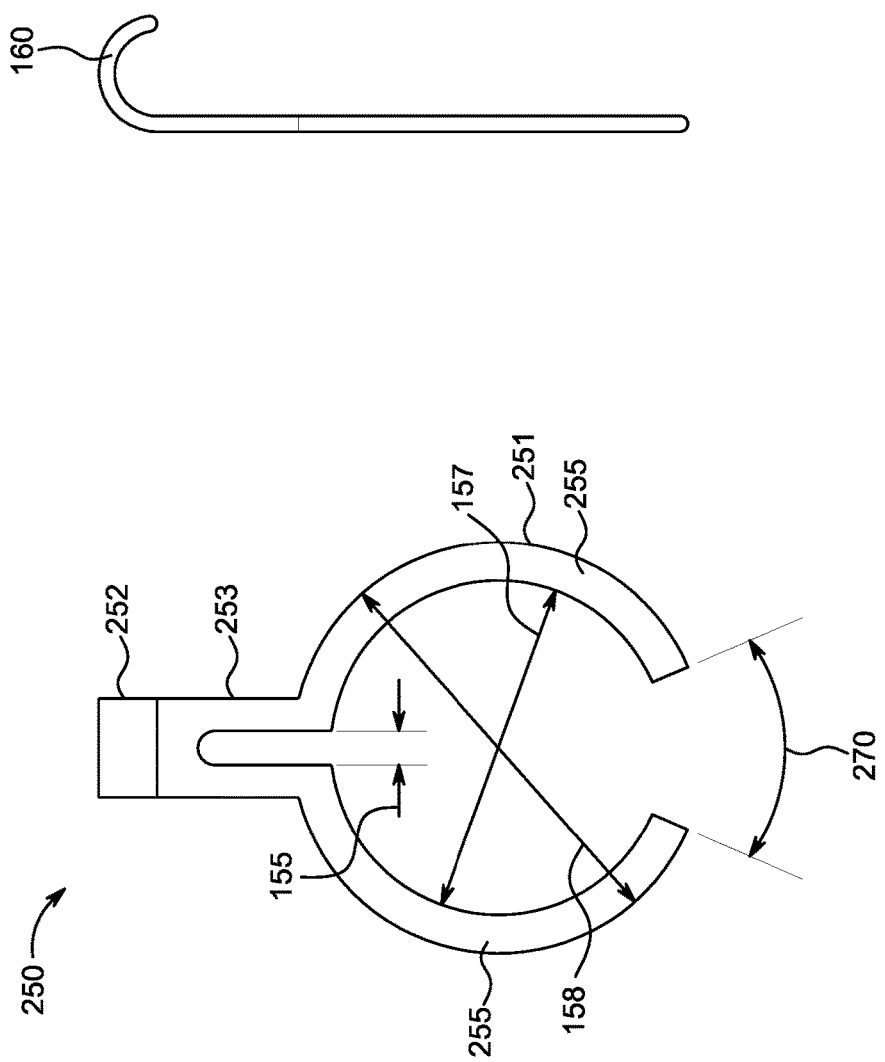
FIG. 7 shows a view of fork clip according to an embodiment.

In another embodiment, a clip 250, shown in FIGS. 4 and 7, is a shaped like a fork, and differs from the clip 150 of the embodiment described, in that it includes a first portion 251, a second portion 252, a third portion 253, and two arms 255 that extend from the third portion 253, but that do not form a complete ring. In this embodiment, the portion of the ring that is "missing" (portion 270, in FIG. 7) may preferably be from 90 degrees up to about 130 degrees, and, more preferably, about 120 degrees. This structure has the advantage that the open-arm construction permits the first portion 251 of the clip 250 to be snapped in place on the body portion of the closure element 113, for example, after the fully-assembled fire protection sprinkler 100 has passed the test for leakage. In contrast, the ring clip ring 150 is sandwiched between the seal washer 125 and the closure element 113, and is then hinged onto the output orifice 112. The fire protection sprinkler 100 incorporating this fork clip 250 functions in the same manner as described above in connection with the ring clip 150 embodiment.

The clip 150 or 250 can be made of stainless steel or other metals. Other materials may, however, be suitable, and are not excluded from the scope of the invention. Also, while the embodiments shown include upright fire protection sprinklers, the invention is also applicable to pendent and horizontal sidewall fire protection sprinkler configurations, as well. The present invention is also applicable to fire protection sprinklers of substantially any size, for example, fire protection sprinklers having a K-factor from 2 gpm/(psi)$^{1/2}$ to 50 gpm/(psi)$^{1/2}$ or more, where the K-factor is defined as $K=Q/\sqrt{p}$, where Q is the flow rate in gallons per minute from the outlet of the fire protection sprinkler, and p is the residual pressure at the inlet of the fire protection sprinkler in pounds per square inch.

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

In addition, it should be understood that the attached drawings, which help to explain the invention described herein, are presented as illustrative examples. The architecture of the present invention is sufficiently flexible and configurable, such that it can be utilized and navigated in ways other than that shown in the drawings.

It is also to be understood that the procedures recited in the claims need not be performed in the order presented.

What is claimed is:

1. A fire protection sprinkler comprising:
   (A) a sprinkler body having:
      (a) an input orifice at an input end;
      (b) a threaded portion at the input end, on an outer surface of the body, the threaded portion being configured to be connected to a fluid conduit to receive a fluid;
      (c) an output orifice at an output end;
      (d) a pair of frame arms that extend from the output end and form a hub positioned in axial alignment with the output orifice; and
      (e) a boss, provided between the input end and the output end, the boss including a circumferential portion having flat edges, and including a cavity on one of the flat edges;

(B) a closure element configured to be held in the output orifice to seal a flow of fluid from the output orifice;

(C) a thermally-responsive element positioned between the closure element and the hub of the frame arms, and configured to releasably retain the closure element in the output orifice; and (D) a clip having:
(a) a first portion that is engaged with the closure element; and
(b) a second portion configured to be inserted into the cavity on the one of the flat edges of the circumferential portion of the boss of the sprinkler body, and configured to contact the cavity such that, upon actuation of the fire protection sprinkler, the clip rotates about an axis passing through two points of contact between the cavity and the second portion, and moves the closure element away from the sprinkler body to permit flow of the fluid from the output orifice.

2. The fire protection sprinkler of claim 1, wherein the first portion of the clip engages the closure element resiliently.

3. The fire protection sprinkler of claim 1, wherein the first portion of the clip comprises first and second arms extending around and engaging at least a portion of the closure element.

4. The fire protection sprinkler of claim 3, wherein the first and second arms each extend around at least one hundred ten degrees, and up to one hundred eighty degrees, around a periphery of the portion of the closure element.

5. The fire protection sprinkler of claim 1, wherein the second portion of the clip has a first extension portion that extends in a first direction, away from the first portion of the clip, and a second extension portion that extends from the first extension portion in a second direction that is oblique to the first direction, to engage the cavity of the one of the flat edges of the boss of the sprinkler body.

6. The fire protection sprinkler of claim 5, wherein the second portion of the clip is shaped to wrap around an edge of the cavity and to extend into the cavity of the one of the flat edges of the boss of the sprinkler body.

7. The fire protection sprinkler of claim 1, wherein the first portion of the clip lies in a first plane, and the second portion of the clip extends away from the first plane.

8. The fire protection sprinkler of claim 1, wherein the first portion of the clip forms a ring.

9. The fire protection sprinkler of claim 8, wherein the ring has a first width about at least a portion of a circumference of the ring, and a second width in a second portion of its circumference, the second width being greater than the first width, and an inner periphery of the ring being substantially a straight line in the second portion of the circumference.

10. The fire protection sprinkler of claim 1, wherein the first portion of the clip is shaped as a fork.

11. The fire protection sprinkler of claim 1, wherein the boss of the sprinkler body is a wrench boss.

12. The fire protection sprinkler of claim 11, wherein the cavity on the one of the flat edges of the circumferential portion of the wrench boss is recessed toward the output orifice so that the second portion of the clip does not protrude past the one of the flat edges of the circumferential portion of the wrench boss.

13. A closure element assembly for a fire protection sprinkler, the closure element assembly comprising:

(A) closure element body configured to be held in an output orifice of the fire protection sprinkler to seal a flow of fluid from the output orifice; and (B) a clip having:
(a) a first portion that is engaged with the closure element body; and
(b) a second portion configured to be inserted into a cavity on one of flat edges of a circumferential portion of a boss of a sprinkler body of the fire protection sprinkler, and configured to contact the cavity such that, upon actuation of the fire protection sprinkler, the clip rotates about an axis passing through two points of contact between the cavity and the second portion, and moves the closure element away from the output orifice to permit flow of fluid from the output orifice.

14. The closure element assembly of claim 13, wherein the first portion of the clip engages the closure element resiliently.

15. The closure element assembly of claim 13, wherein the first portion of the clip comprises first and second arms extending around and engaging at least a portion of the closure element.

16. The closure element assembly of claim 15, wherein the first and second arms each extend around at least one hundred ten degrees, and up to one hundred eighty degrees, around a periphery of the portion of the closure element.

17. The closure element assembly of claim 13, wherein the second portion of the clip has a first extension portion that extends in a first direction, away from the first portion of the clip, and a second extension portion that extends from the first extension portion in a second direction that is oblique to the first direction, to engage the cavity of the one of the flat edges of the boss of the sprinkler body.

18. The closure element assembly of claim 17, wherein the second portion of the clip is shaped to wrap around an edge of the cavity and to extend into the cavity of the one of the flat edges of the boss of the sprinkler body.

19. The closure element assembly of claim 13, wherein the first portion of the clip lies in a first plane, and the second portion of said clip extends away from the first plane.

20. The closure element assembly of claim 13, wherein the first portion of the clip forms a ring.

21. The fire protection sprinkler of claim 20, wherein the ring has a first width about at least a portion of a circumference of the ring, and a second width in a second portion of its circumference, the second width being greater than the first width, and an inner periphery of the ring being substantially a straight line in the second portion of the circumference.

22. The closure element assembly of claim 13, wherein the first portion of the clip is shaped as a fork.

23. The closure element assembly of claim 13, wherein the second portion of the clip does not protrude past the one of the flat edges of the circumferential portion of the wrench boss.

24. A method of assembling a fire protection sprinkler, the method comprising:

(A) providing a sprinkler body having:
(a) an input orifice at an input end;
(b) a threaded portion at the input end, on an outer surface of the body, the threaded portion being configured to be connected to a fluid conduit to receive a fluid;
(c) an output orifice at an output end;

(d) a pair of frame arms that extend from the output end and form a hub positioned in axial alignment with the output orifice; and (e) a boss, provided between the input end and the output end, the boss including a circumferential portion having flat edges, and including a cavity on one of the flat edges;

(B) providing a closure element configured to be held in the output orifice to seal a flow of fluid from the output orifice;

(C) providing a thermally-responsive element positioned between the closure element and the hub of the frame arms, and configured to releasably retain the closure element in the output orifice;

(D) providing a clip having:

(a) a first portion that is resilient and is shaped to engage with the closure element; and (b) a second portion configured to be inserted into the cavity of the boss of the sprinkler body, and configured to contact the cavity on the one of the flat edges of the circumferential portion of the boss of the sprinkler body such that, upon actuation of the fire protection sprinkler, the clip rotates about an axis passing through two points of contact between the cavity and the second portion, and moves the closure element away from the sprinkler body to permit flow of fluid from the output orifice; and (E) attaching the clip to the closure element by resiliently fitting the clip to the closure element, and placing the closure element in the output orifice of the sprinkler body to seal the output orifice.

25. The method of claim 24, wherein the clip is attached to the closure element after the fire protection sprinkler is fully assembled and has passed a hydrostatic test.

26. The method of assembling a fire protection sprinkler of claim 24, wherein the first portion of the clip engages the closure element resiliently.

27. The method of assembling a fire protection sprinkler of claim 24, wherein the first portion of the clip comprises first and second arms extending around and engaging at least a portion of the closure element.

28. The method of assembling a fire protection sprinkler of claim 27, wherein the first and second arms each extend around at least one hundred ten degrees, and up to one hundred eighty degrees, around a periphery of the portion of the closure element.

29. The method of assembling a fire protection sprinkler of claim 24, wherein the second portion of the clip has a first extension portion that extends in a first direction, away from the first portion of the clip, and a second extension portion that extends from the first extension portion in a second direction that is oblique to the first direction, to engage the cavity of the one of the flat edges of the boss of the sprinkler body.

30. The method of assembling a fire protection sprinkler of claim 29, wherein the second portion of the clip is shaped to wrap around an edge of the cavity and to extend into the cavity of the one of the flat edges of the boss of the sprinkler body.

31. The method of assembling a fire protection sprinkler of claim 24, wherein the first portion of the clip lies in a first plane, and the second portion of said clip extends away from the first plane.

32. The method of assembling a fire protection sprinkler of claim 24, wherein the first portion of the clip forms a ring.

33. The method of assembling a fire protection sprinkler of claim 32, wherein the ring has a first width about at least a portion of a circumference of the ring, and a second width in a second portion of its circumference, the second width being greater than the first width, and an inner periphery of the ring being substantially a straight line in the second portion of the circumference.

34. The method of assembling a fire protection sprinkler of claim 24, wherein the first portion of the clip is shaped as a fork.

35. The method of assembling a fire protection sprinkler of claim 24, wherein the boss of the sprinkler body is a wrench boss.

36. The method of assembling a fire protection sprinkler of claim 24, wherein the cavity on the one of the flat edges of the circumferential portion of the wrench boss is recessed toward the output orifice so that the second portion of the clip does not protrude past the one of the flat edges of the circumferential portion of the wrench boss.

* * * * *